Patented June 20, 1939

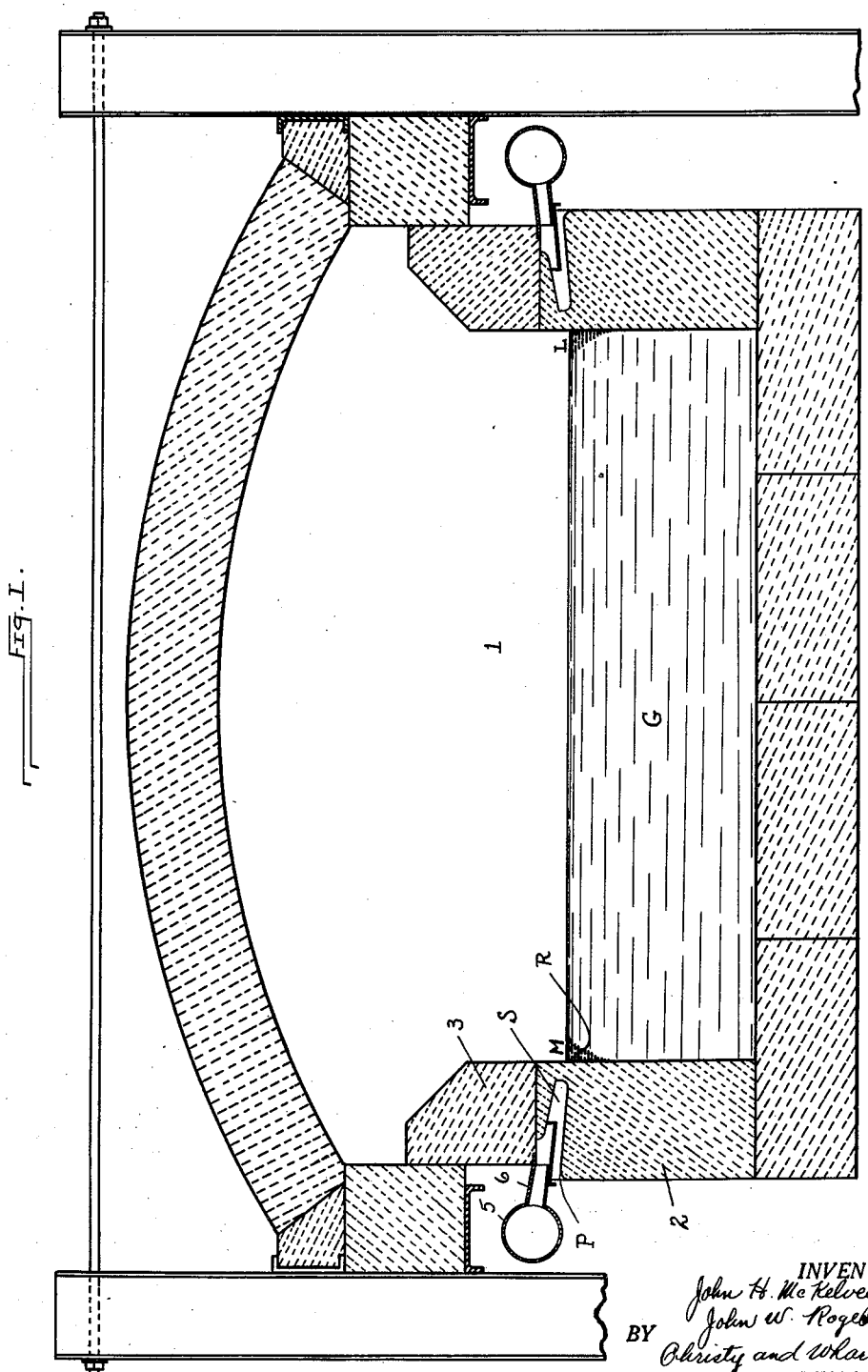

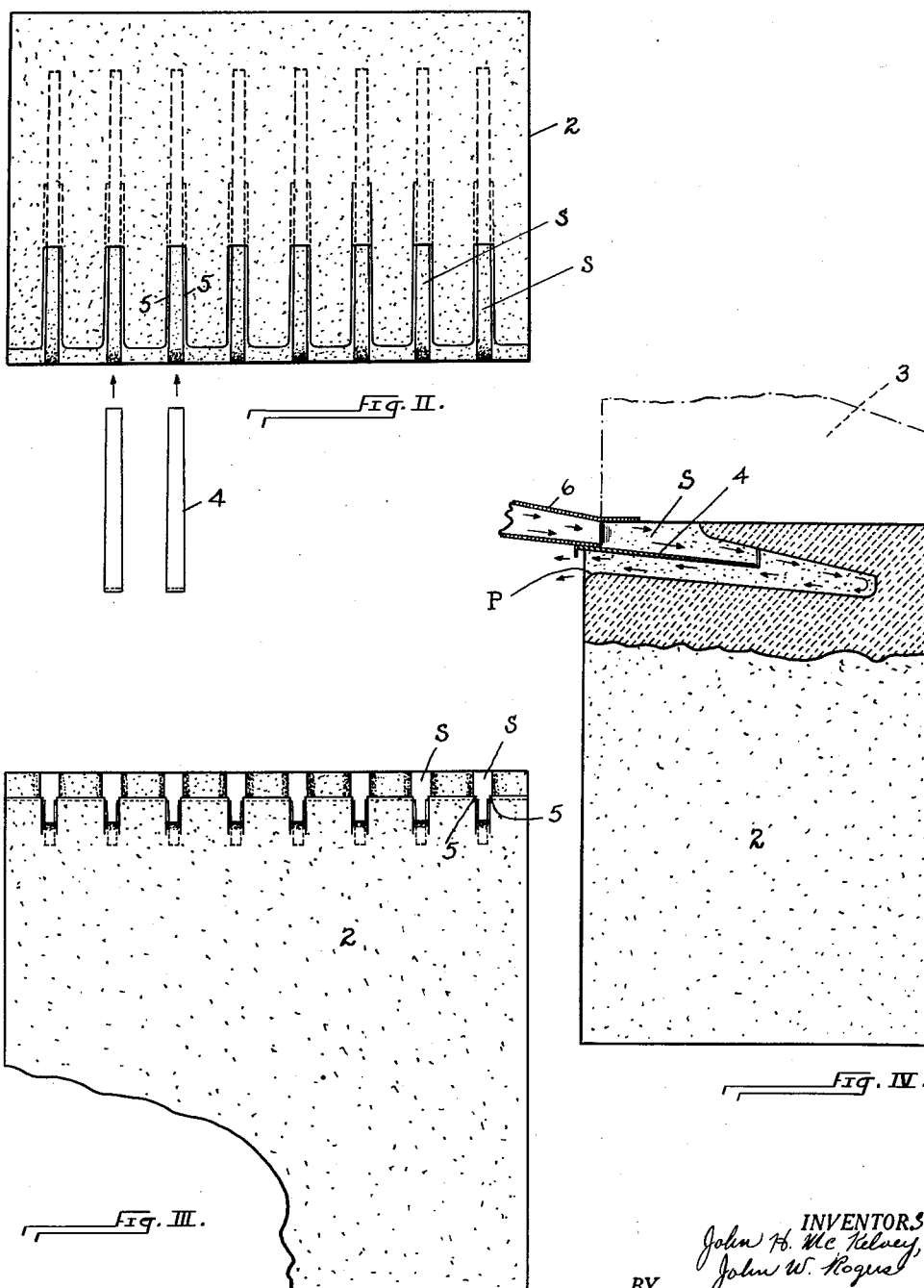

2,163,405

UNITED STATES PATENT OFFICE 2,163,405

GLASS TANK

John Henry McKelvey and John W. Rogers, Kirkwood, Mo., assignors to Laclede-Christy Clay Products Company, a corporation of Missouri Application July 12, 1937, Serial No. 153,154

3 Claims. (Cl. 49—54)

This invention concerns tank blocks for glass furnaces, and consists in improvement in structure. The object is durability.

In the accompanying drawings, Fig. I is a view in vertical and transverse section of a glass tank in whose structure the present invention is embodied; Fig. II is a view to larger scale and in plan from above of a tank block that enters into the structure of the tank of Fig. I; and, in Fig. I, certain slides are diagrammatically indicated that in service are applied to slots formed in the tank block. Fig. III is a view of the tank block in rear elevation; and Fig. IV is a view of the same block, partly in side elevation, partly in vertical and transverse section. In it the slides are shown applied to the slots, and other cooperating parts are shown in operative assembly.

Glass tanks have heretofore been built with walls that are slotted, for the circulation of streams of cooling fluid—ordinarily air. In the operation of tanks so particularly constructed, not only is it necessary to provide means for circulating the air; it is a practical necessity to provide auxiliary equipment that may be brought into service on short notice, to maintain air circulation, in case of failure—in the words of the industry, "offage"—in the supply of power by which the normal circulation of air is maintained. Otherwise, the hot glass within the tank may break through the wall, and both tank and charge be lost.

The walls of glass tanks are liable to erosion by the molten glass that forms the charge within the tank. Referring to Fig. I, the charge of glass G within the tank I is refined and brought to and maintained in molten condition by flame that plays upon the surface. The "hot spot" is that area of surface, intermediate the walls, upon which the play of flame is concentrated. The entire body of glass within the tank is molten, and the continued play of flame upon the surface sets up currents of circulation within the body of glass. Current flow is outward at the surface from the hot spot to the tank walls, thence downward over the vertical surfaces of the walls, then inward over the bottom of the tank toward the centre, and upward again to the hot spot. The streams of glass that sweep the side walls of the tank from the metal line M—L downward erode the substance of the walls, with the effect not only of impairing the quality of the glass, but also of gradually destroying the tank itself. The cooling of the tank walls by such means as we have mentioned has the effect of decreasing the fluidity of the glass that is in immediate contact with the side walls; slowing down the rate of circulatory flow upon the vertical surfaces of the side walls; shifting inward from the planes of the surfaces of the side walls the lines of maximum flow of the circulatory currents of molten glass; and the consequent diminution of the rate of erosion of the substance of the walls.

We have perceived that, in consequence of improvement in quality of tank blocks, not only is erosion more narrowly limited to the region immediately adjacent the metal line of the charge within the tank; but we have further perceived that the cooling slots may be shifted in position: they may be so placed that at the outer or rearward side of the wall they open, both for the intake and the discharge of the cooling air, at higher level than the metal line. From such higher levels they may extend obliquely downward and inward to approximation to the inner face of the tank wall and at approximately the metal line; and thus the desired effect may be achieved of relative congealing of the molten glass in the region of erosion; and at the same time, in case of failure of power, the erosion that then becomes active will not in any brief interval of time effect perforation of the wall and loss of both furnace and charge.

In Fig. I we show the cooling slots S formed in the side wall 2 of the tank; and these slots at their outer or rearward ends extend to low points P that are above the level of the metal line M—L. Manifestly no penetration of molten glass to the inner ends of slots S can result in outflow of glass through the slots.

The wall of such a tank as this is ordinarily built of blocks, and such a tank block is shown in detail in Figs. II-IV. The slot S opens at the upper, outer corner of the block; as a matter of facility in molding, it breaks through both the upper horizontal surface and the outer vertical surface of the block; and it extends obliquely downward to effective cooling proximity to the inner vertical face of the block at the metal line of the batch of molten glass within the completed furnace. It may extend somewhat below the level of the metal line; but in any case the low point P of the outer end of the slot will be above the level of the metal line. The figures of an actual embodiment are, in a tank block 12 inches thick, a slot that terminates inwardly at an interval of 2 inches from the inner face of the block. The bottom wall of the slot slopes through a vertical interval of three quarters of an inch in the ten inches of its horizontal extent.

In the assembly the slot at its inner end extends substantially to the metal line; it may extend below the metal line to a distance of the order of one sixteenth of an inch or more. In any case, however, the point P, the low point in the outer open end of the slot, is above the plane of the metal line.

The tank block 2 is in the structure overlain by a tuck block 3. This tuck block closes the slot above, leaving an opening in the outer vertical wall that is 2 1/16 inches in its vertical extent. The side walls of the slot taper slightly (an eighth of an inch in ten inches) from outer to inner end, and the slot tapers in vertical plane to a height at its inner end of three quarters of an inch.

A septum extends transversely across the slot, and from the outer end inwardly, and terminates short of the inner end. This septum conveniently takes the form of a metal plate 4 that rests on ledges 5 formed for its support in the side walls of the slot. The inward extent of the septum is, in the particular instance specified, of the order of 6 inches. And, being made as a separate part, it is adjustable upon its supporting ledges inwardly and outwardly to afford optimum effect. Such adjustment may be found advantageous as a furnace continues in service; and, toward the end of a campaign the septum may be withdrawn entirely. The width of the slot at the outer end and above the ledges is five eighths of an inch; below, one half an inch.

The septum 4, when in place, forms with the slot a prolonged passageway for a cooling stream of air from the outer end of the slot inward, and back to the outer end again. Means are provided for causing cooling fluid, ordinarily air, to flow in such passageway; and, while the input may be either below or above the septum (and the escape, correspondingly, above or below), we have shown the input above. A manifold 5 (Fig. I) is provided, through which a supply of cold air under sufficient pressure may be afforded, and from this manifold spouts 6 lead to the slots, as shown in Figs. I and IV.

The tank wall is provided throughout all its extent with a succession of such slots, and the centre to centre spacing of the slots is, in the particular embodiment shown, 2 1/8 inches.

The dimensions given are exemplary, merely; they are given as what is now considered to be typical successful embodiments of the invention; but to them, as will be understood, the invention is not, in intent, limited.

In operation, when the body of glass G within the tank I is brought to molten state, with the development of circulatory currents within the pool, care is taken that streams of cooling air shall be flowing in the slots S, and that such flow shall be maintained so long as the molten condition of the glass continues. The effect of the cooling is to develop at the margin of the pool a rim R of less molten and relatively congealed glass. This rim will be of widest extent at the surface, and will taper downward, substantially as indicated by the heavy shading at R, Fig. I. This is the region to which, in blocks of high quality, severe erosion is limited. The stiffening of the molten glass at the rim of the pool brings about a slowing down of the circulation currents in that region (or even complete cessation), a shifting of the current flow away from the surface of the tank block and toward the centre of the pool. The rate of wall erosion is greatly diminished, and erosion consequent on current flow is practically eliminated. In case of failure of power, and consequent failure of flow of cooling streams of air, though the rim of congealed glass R at the margin of the pool may be melted, and erosive current flow may sweep the surface of the tank wall, and though the intervening two inches of wall substance may be eroded away, so that the molten glass reaches the inner ends of some or all of the slots S, still there will be no escape of glass, nor will the tank be ruined. Erosion will continue, to be sure, as in the case of an unslotted tank wall; but, under all ordinary circumstances, power will soon be available again; circulation of cooling streams of air in the slots will again be set up; the glass at the somewhat extended rim of the pool will be congealed again; and the cooling system will be effective to check further erosion.

In Letters Patent No. 2,077,705, granted on our application April 20, 1937, a tank structure is shown in which the wall is slotted and the slots extend vertically from the metal line downward. In the operation of that furnace, successful though it is, prudence dictates the provision of ancillary apparatus, to be brought into service in case the normal source of power fails, which shall maintain the requisite circulation of cooling air in the slots. Otherwise, the tank may be ruined and its contents lost. The rearrangement of the slots in the manner herein described removes the danger; the furnace walls will not, in the event of failure of power, be penetrated by molten glass; and the slots so rearranged will still be effective to prolong furnace life. The cooling provision that is described in this specification has the further result and effect that the thickness of the tank wall is not limited to a maximum permissive of heat dissipation at a certain rate, but may be indefinitely increased.

We claim as our invention:

1. A glass tank with refractory walls provided with a plurality of cooling slots arranged in longitudinal succession and substantially at the metal line of the tank, each slot extending from the outer face of the wall inward toward the inner face, but less in its inward extent than the thickness of the wall and closed at its inner end, each slot inclined downwardly from the open outer end (which is arranged wholly above the metal line) to the closed inner end (which is arranged at but not substantially below the metal line), each slot being provided with a transversely arranged septum that extends from the outer open end inward toward but terminates short of the closed inner end thereof, dividing the outer open end of the slot into adjacent intake and discharge openings, and defining a passageway for a cooling fluid between such intake and discharge openings, the said septum terminating inwardly at a level above the metal line.

2. The structure of claim 1, the septum being adjustable in position longitudinally of the slot.

3. The structure of claim 1, the slot being provided with ledges in its side walls and the septum consisting of a plate resting upon such ledges.

JOHN HENRY McKELVEY.
JOHN W. ROGERS.